United States Patent [19]

Thompson-Ashworth

[11] Patent Number: 4,754,997
[45] Date of Patent: Jul. 5, 1988

[54] GLIDER DOORS

[75] Inventor: Derek Thompson-Ashworth, Bakewell, England

[73] Assignee: Stone International PLC, West Sussex, England

[21] Appl. No.: 61,497

[22] Filed: Jun. 15, 1987

[51] Int. Cl.$^4$ ............................................. B60J 5/04
[52] U.S. Cl. ..................................... 296/146; 49/250; 49/252
[58] Field of Search .................. 296/155, 146; 49/250, 49/252, 246

[56] References Cited

U.S. PATENT DOCUMENTS

| 1,593,624 | 7/1926 | Fairhurst | 49/250 |
| 1,676,375 | 7/1928 | Graff-Baker | 49/250 |
| 1,957,645 | 5/1934 | Herman | 296/155 |
| 2,926,040 | 2/1960 | Kramer et al. | 296/146 |

Primary Examiner—Robert R. Song
Attorney, Agent, or Firm—Stevens, Davis, Miller & Mosher

[57] ABSTRACT

In a glider door for use in a bus or streetcar with a step within the door, one lower corner of the door panel is cut away so as to clear the step when the door is open, and a subsidiary panel of a size to close the door panel is carried by a lower swing link supporting the door panel so as to close the cut away portion when the door is closed.

3 Claims, 2 Drawing Sheets

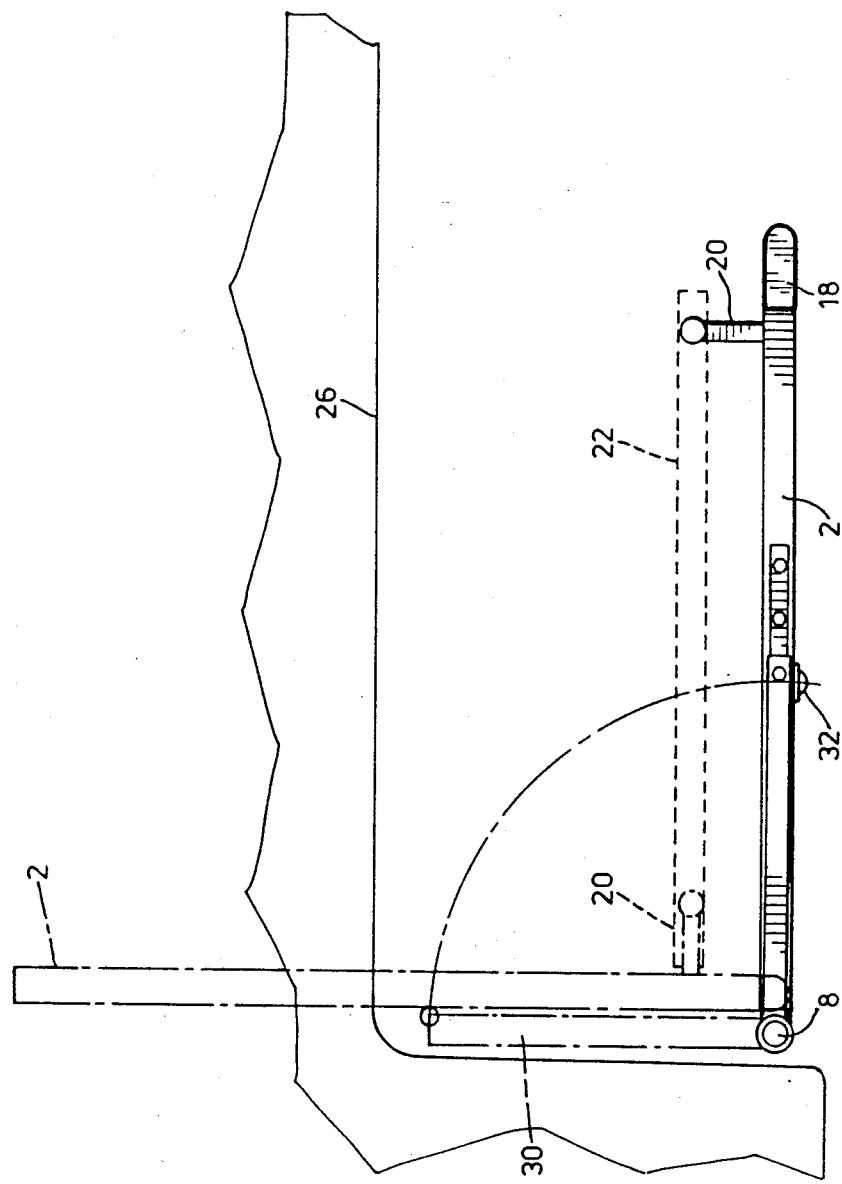

4,754,997

GLIDER DOORS

FIELD OF THE INVENTION

This invention relates to doors, particularly for passenger carrying vehicles such as buses and streetcars.

BACKGROUND OF THE INVENTION

Passenger entry and exit doors for such vehicles are commonly approached from within the vehicle by one or more steps so as to provide reasonably easy access between street level and an interior floor level of the vehicle. The presence of such steps restricts the depth of the space available for accommodating the operation of doors within the door opening, and often precludes the use of door leaves of the glider type, which are guided for movement between a closed position across the door opening to an open position at the side of and perpendicular to the door opening. If the available depth of the bottom step is less than that required to accommodate the door leaf, a slot must be formed in the next step to receive a portion of the door leaf when open. This slot is unacceptable to many operators because of the danger of, for example, a child's foot being trapped as the door moves to its open position, and has led to continued use in many applications of bifold door structures rather than glider type doors which are more robust and have a better appearance.

SUMMARY OF THE INVENTION

The present invention is directed to a glider door structure for use in applications in which shallow steps have traditionally required use of a bifold structure.

A glider door structure conventionally includes a main door panel located in a substantially vertical plane, a vertical support adjacent one vertical edge of the door panel when the latter is in a first closed position, vertically spaced horizontal links extending from said support to vertically spaced pivotal connections intermediate the width of the door panel, and horizontal guide track means extending parallel to the door in its closed position and engaged by guide means secured to the door beyond the pivotal connections, such that as the guide means move along the track means towards the support, the links swing about the support to move that edge of the door initially adjacent the support away from the latter in a direction generally perpendicular to the direction of the track and to move the opposite edge of the door towards the support so that the door assumes an open position adjacent the support and substantially perpendicular to its closed position.

According to the invention, a substantially rectangular aperture is formed at the lower corner of the door adjacent the support, and one of said vertically spaced links carries a rectangular subsidiary panel which closes the rectangular aperture when the door is in its closed position, the aperture being of a size to provide clearance for a step when the door is in its open position.

This arrangement enables the door to clear steps provided that the clearance available between the riser of the step and the support is not less than the length of the links, and can provide the advantages of a bifold structure without its disadvantages. The subsidiary panel can be robustly supported by one of the links and need not be hinged to the remainder of the door.

Further features of the invention will become apparent from the following description of an exemplary preferred embodiment with reference to the accompanying drawings.

SHORT DESCRIPTION OF THE DRAWINGS

FIG. 1 is an external elevation of a door structure in accordance with the invention; and FIG. 2 is a diagrammatic plan view of an installation of a similar door structure, illustrating movement of certain parts during opening and closing.

DESCRIPTION OF THE PREFERRED EMBODIMENTS

Figure 1:
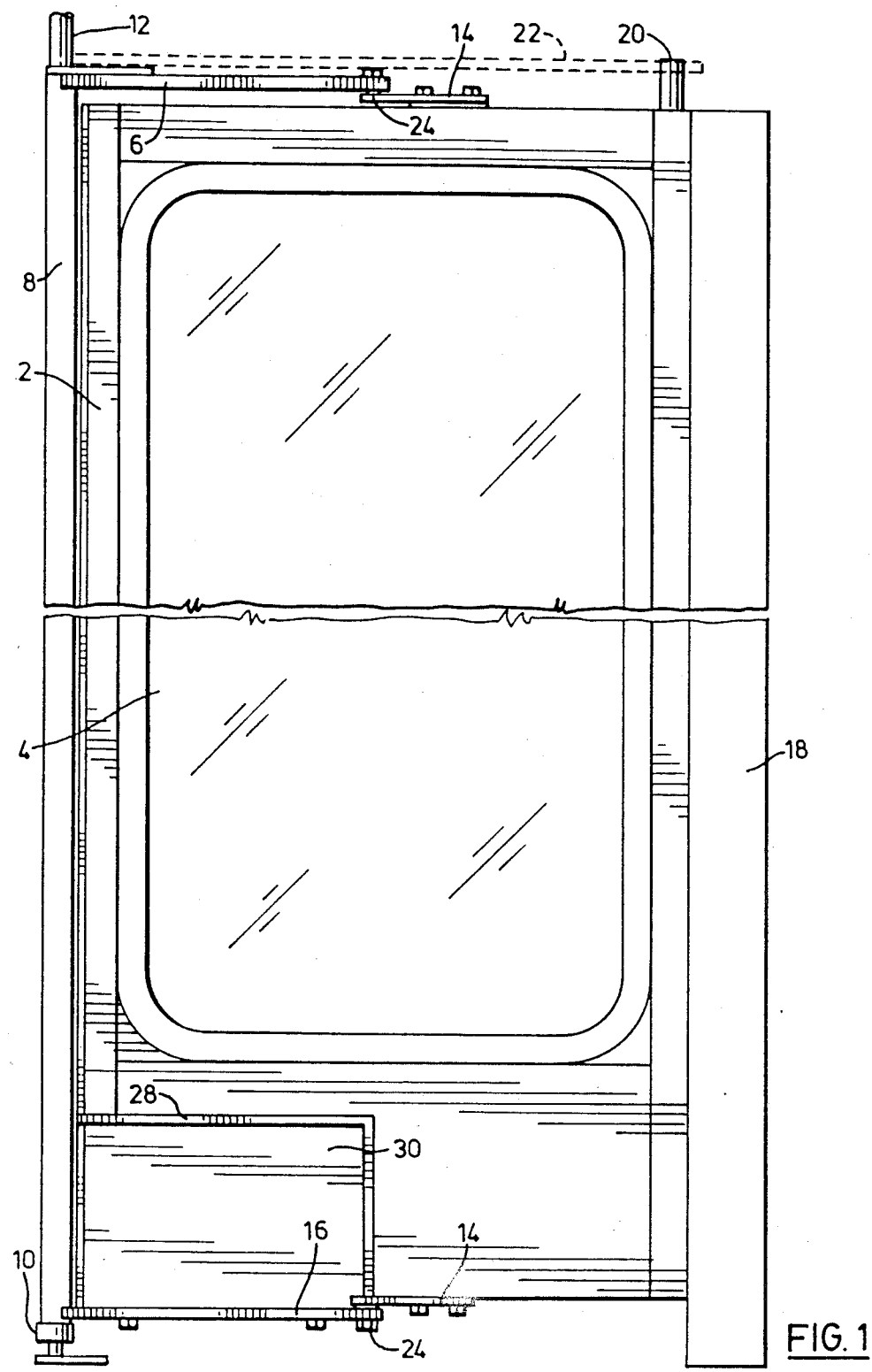

In the drawings a door panel 2 is shown, provided with a window 4. The panel may be one of an opposite handled pair, or a single door panel, depending on the width required. The panel is carried on pivots 24 by links 6, 16 extending horizontally from a support 8 adjacent one edge of the door in its closed position. The support 8 is carried by a bottom bearing 10, and a shaft 12 is continued upwardly through a top bearing (not shown) and connected to an actuator (not shown) which turns the shaft and thus the links 6 and 16 to actuate the door as described further below. The links 6 are connected to the panel 2 by brackets 14. The other edge of the door carries a rubber nose piece 18. A follower 20 engages a track 22 in the structure of the vehicle to which the door is fitted so as to guide the other edge of the door across a door opening as the door is opened, the combined effect of the links 6 turning about the axis of the support 8 and the follower 20 sliding in the track 22 being to move the door panel 2 from the position shown in solid lines in FIG. 2 through to positions shown in broken lines to an open position in which the door panel is perpendicular to its closed position and adjacent the support 6.

Thus far, construction and operation of the door is conventional for glider doors. In order to permit the door to move to its open position without fouling a step 26 (see FIG. 2), a rectangular recess is formed in that lower corner of the door which would otherwise foul the step, so as to provide the necessary clearance, and a subsidiary rectangular panel 30 of a size to close the recess is mounted on the lower link 16, suitable weatherstripping 28 being applied to the edges of the recess. As the door opens, the subsidiary panel 30 is carried to a position behind the main panel 2, thus providing an effect similar to a bifold door so far as step clearance is concerned. Since the panel 30 can often be adequately supported by the link 16, a hinge 32 shown in FIG. 2 attaching it to the main panel may be omitted, and therefore the subsidiary panel may be of any size required to provide the desired clearance provided that its width does not exceed the length of the link 16. Conveniently the panel 30 is substantially coextensive with the link, so as to enable a hinge 32 to be used if desired.

I claim:

1. In a glider door structure comprising a main door panel located in a substantially vertical plane, a vertical support adjacent one vertical edge of the door panel when the latter is in a first closed position, vertically spaced horizontal links extending from said support to vertically spaced pitoval connections intermediate the width of the door panel, and horizontal guide track means extending parallel to the door in its closed position and engaged by guide means secured to the door beyond the pivotal connections, such that as the guide means move along the track towards the support, the links swing about the support to move that edge of the door initially adjacent the support away from the latter in a direction generally perpendicular to the direction of the track and to move the opposite edge of the door towards the support, so that the door assumes an open position adjacent the support and substantially perpendicular to its closed position;

the improvement wherein a substantially rectangular aperture is formed at the lower corner of the door adjacent the support, and one of said vertically spaced links carries a rectangular subsidiary panel which closes the rectangular aperture when the door is in its closed position, the aperture being of a size to provide clearance for a step when the door is in its open position.

2. A glider door structure according to claim 1, wherein the subsidiary panel has substantially the same extent as the link which supports it.

3. A glider door structure according to claim 2, wherein the subsidiary panel is connected to the main door panel by a vertical hinge.

* * * * *